US009614627B2

(12) United States Patent
Yu et al.

(10) Patent No.: US 9,614,627 B2
(45) Date of Patent: Apr. 4, 2017

(54) METHOD AND DEVICE FOR TESTING PERFORMANCE OF WIRELESS TERMINAL

(71) Applicant: General Test Systems Inc., Shenzhen (CN)

(72) Inventors: Wei Yu, Shenzhen (CN); Yihong Qi, Shenzhen (CN)

(73) Assignee: General Test Systems Inc. (CN)

( * ) Notice: Subject to any disclaimer, the term of this patent is extended or adjusted under 35 U.S.C. 154(b) by 0 days.

(21) Appl. No.: 14/441,061

(22) PCT Filed: Dec. 3, 2013

(86) PCT No.: PCT/CN2013/088400
§ 371 (c)(1),
(2) Date: May 6, 2015

(87) PCT Pub. No.: WO2014/086268
PCT Pub. Date: Jun. 12, 2014

(65) Prior Publication Data
US 2015/0280844 A1    Oct. 1, 2015

(30) Foreign Application Priority Data
Dec. 3, 2012 (CN) .......................... 2012 1 0508842

(51) Int. Cl.
*H04B 3/46* (2015.01)
*H04B 17/29* (2015.01)
(Continued)

(52) U.S. Cl.
CPC ............... *H04B 17/29* (2015.01); *H04B 7/02* (2013.01); *H04B 17/0085* (2013.01);
(Continued)

(58) Field of Classification Search
CPC .... H04B 17/0085; H04B 17/12; H04B 17/14; H04B 17/29; H04B 17/3912
(Continued)

(56) References Cited

U.S. PATENT DOCUMENTS

2011/0084887 A1*  4/2011  Mow ...................... G01R 29/10
                                                            343/703
2012/0201319 A1*  8/2012  Asplund .............. H04B 7/0413
                                                            375/267
(Continued)

FOREIGN PATENT DOCUMENTS

CN    102130725 A    7/2011
CN    102148649 A    8/2011

OTHER PUBLICATIONS

International Search Report and Written Opinion for Application No. PCT/CN2013/088400 dated Mar. 6, 2014.

*Primary Examiner* — Leila Malek
(74) *Attorney, Agent, or Firm* — Lerner, David, Littenberg, Krumholz & Mentlik, LLP

(57) ABSTRACT

A method and a device for testing a performance of a wireless terminal and a computer readable storage medium are provided. The wireless terminal is placed in a first anechoic chamber and comprises m antennas, where m is a positive integer greater than 1. The method comprises steps of: S1, obtaining m pieces of antenna pattern information of the m antennas; S2, obtaining n first testing signals according to the m pieces of antenna pattern information, where n is a positive integer greater than 1; S3, feeding the n first testing signals to n testing antennas in a second anechoic chamber, and transmitting the n first testing signals to the wireless terminal by the n testing antennas; and S4, obtaining a piece of receiving information of the m antennas for the n first testing signals, and obtaining the performance of (Continued)

the wireless terminal according to the piece of receiving information.

17 Claims, 7 Drawing Sheets

(51) Int. Cl.
*H04B 17/00* (2015.01)
*H04B 17/391* (2015.01)
*H04B 17/24* (2015.01)
*H04B 7/02* (2017.01)
*H04B 17/12* (2015.01)
*H04B 17/14* (2015.01)

(52) U.S. Cl.
CPC ......... *H04B 17/24* (2015.01); *H04B 17/3912* (2015.01); *H04B 17/12* (2015.01); *H04B 17/14* (2015.01)

(58) Field of Classification Search
USPC .......................................................... 375/224
See application file for complete search history.

(56) References Cited

U.S. PATENT DOCUMENTS

| | | | | |
|---|---|---|---|---|
| 2013/0073506 A1* | 3/2013 | Camp | ................ | G06N 5/02 |
| | | | | 706/46 |
| 2013/0271317 A1* | 10/2013 | Goel | ................ | G01S 19/23 |
| | | | | 342/357.62 |
| 2014/0087668 A1* | 3/2014 | Mow | ................ | H04W 24/00 |
| | | | | 455/67.14 |

* cited by examiner

METHOD AND DEVICE FOR TESTING PERFORMANCE OF WIRELESS TERMINAL

CROSS-REFERENCE TO RELATED APPLICATION

This application is a national phase entry of International Application No. PCT/CN2013/088400, filed with the State Intellectual Property Office of P. R. China on Dec. 3, 2013, which is based upon and claims priority to Chinese Patent Application Serial No. 201210508842.9, filed on Dec. 3, 2012, the entire content of which is incorporated herein by reference.

FIELD

The present disclosure relates to a wireless terminal field, and more particularly to a method for testing a performance of a wireless terminal and a device for testing a performance of a wireless terminal.

BACKGROUND

FIG. 1 is a schematic diagram of a multi-input multi-output (MIMO) antenna system. As shown in FIG. 1, the MIMO antenna system comprises a plurality of transmitting antennas and a plurality of receiving antennas. Each transmitting antenna sends the data stream independently in the case of the spatial multiplexing, so that the ideal data transfer rate of the N×N MIMO antenna system can be N times as large as that of the SISO (single input single output) antenna system. However, the actual data transfer rate of the MIMO antenna system cannot achieve the ideal data transfer rate. In addition to the space propagation environment, the performance of the wireless terminal as the receiving terminal of the MIMO antenna system has a significant influence on the data transfer rate.

The method for testing the performance of the wireless terminal is need in one controlled environment propagation. Currently, there are three methods used.

(1) Reverb darkroom method: the wireless terminal is placed in the reverb darkroom without anechoic materials for testing. However, there are some problems: the number of the spatial channel propagation models is limited; and the antenna pattern of the wireless terminal cannot be obtained.

(2) Multi-probe method: a multi-probe channel simulator and a plurality of testing antennas surrounding the wireless terminals are used to simulate the spatial channel propagation model. However, there are some problems: the cost of the whole testing system is very high, and the calibration operation is complex.

(3) Two-stage method: FIG. 2 is a schematic diagram of a testing system using a two-stage method. As shown in FIG. 2, the process is divided into two Stages.

Stage 1: a plurality of antenna patterns of a plurality of antennas of the wireless terminal (MIMO DUT as shown in FIG. 2) are obtained using the testing system of the SISO antenna system.

Stage 2: the plurality of antenna patterns are fed to the channel simulator to output testing signals, and the testing signals are sent to the wireless terminal via a cable.

However, there are some problems: the testing process is divided into two discrete steps, so the implementation process is cumbersome; with the conductivity measurement using an RF cable, the actual testing state of the wireless terminal is changed, so the measurement result is inaccurate.

SUMMARY

Embodiments of the present disclosure seek to solve at least one of the problems existing in the related art to at least some extent.

One objective of the present disclosure is to provide a method for testing a performance of a wireless terminal, which maintains the real working conditions of the wireless terminal to be tested without increasing the cost.

Another objective of the present disclosure is to provide a device for testing a performance of a wireless terminal.

Yet another objective of the present disclosure is to provide a readable storage medium.

According to a first aspect of the present disclosure, a method for testing a performance of a wireless terminal is provided. The wireless terminal is placed in a first anechoic chamber and comprises m antennas, where m is a positive integer greater than 1. The method comprises steps of: S1, obtaining m pieces of antenna pattern information of the m antennas; S2, obtaining n first testing signals according to the m pieces of antenna pattern information, where n is a positive integer greater than 1; S3, feeding the n first testing signals to n testing antennas in the same or a second anechoic chamber, and transmitting the n first testing signals to the wireless terminal by the n testing antennas; and S4, obtaining a piece of receiving information of the m antennas for the n first testing signals, and obtaining the performance of the wireless terminal according to the piece of receiving information.

In some embodiments, step S2 comprises: obtaining m second testing signals according to the m pieces of antenna pattern information, n pieces of preset antenna pattern information of a base station of a multi-input multi-output system, and a spatial channel propagation model of the multi-input multi-output system; obtaining the n first testing signals according to the m second testing signals and a testing channel transfer matrix.

In some embodiments, a relationship between the m second testing signals, the testing channel transfer matrix and the n first testing signals satisfies formula (1), $$\begin{bmatrix} S_1 \\ S_2 \\ \vdots \\ S_m \end{bmatrix} = \begin{bmatrix} a_{11} & a_{12} & \ldots & a_{1n} \\ a_{21} & a_{22} & \ldots & a_{2n} \\ & \vdots & & \\ a_{m1} & a_{m2} & \ldots & a_{mn} \end{bmatrix} \begin{bmatrix} MT_1 \\ MT_2 \\ \vdots \\ MT_n \end{bmatrix}, \quad (1)$$

$$a_{ij} = G(tx\_antj, ij) = P_{ij} + G(rx\_anti, ij),$$

$$i = 1, 2, \ldots, m; j = 1, 2, \ldots, n$$

where $MT_1$ to $MT_n$ represent the n first testing signals, $S_1$ to $S_m$ represent the m second testing signals, $a_{ij}$ represents a complex path gain from an input port of a $j^{th}$ transmitting antenna to an output port of an $i^{th}$ receiving antenna, $G(tx\_antj,ij)$ represents a gain from the $j^{th}$ transmitting antenna to the $i^{th}$ receiving antenna, $G(rx\_anti,ij)$ represents a gain from the $i^{th}$ receiving antenna to the $j^{th}$ transmitting antenna, $P_{ij}$ represents a space path loss from the input port of the $j^{th}$ transmitting antenna to the output port of the $i^{th}$ receiving antenna.

In some embodiments, n is greater than or equal to m.

In some embodiments, the n testing antennas and the wireless terminal remain still in step S3.

In some embodiments, the piece of receiving information is a throughput.

In some embodiments, the first anechoic chamber is the same as the second anechoic chamber.

In some embodiments, a part of the n testing antennas are vertically polarized antennas and the other part of the n testing antennas are horizontally polarized antennas.

In some embodiments, m is 2 and n is 2, the relationship between the two second testing signals and the two first testing signals satisfies formula (2), $$\begin{bmatrix} MT_1 \\ MT_2 \end{bmatrix} = \begin{bmatrix} a_{11} & a_{12} \\ a_{21} & a_{22} \end{bmatrix}^{-1} \begin{bmatrix} S_1 \\ S_2 \end{bmatrix}, \quad (2)$$

$a_{11} = G(\text{tx\_ant1}, 11) + P_{11} + G(\text{rx\_ant1}, 11)$ $a_{21} = G(\text{tx\_ant1}, 11) + P_{21} + G(\text{rx\_ant2}, 21)$ $a_{12} = G(\text{tx\_ant1}, 11) + P_{12} + G(\text{rx\_ant1}, 12)$ $a_{22} = G(\text{tx\_ant1}, 11) + P_{22} + G(\text{rx\_ant2}, 22)$ where $MT_1$ and $MT_2$ represent the two first testing signals, $S_1$ and $S_2$ represent the two second testing signals, $a_{11}$ represents a complex path gain from an input port of a first transmitting antenna to an output port of a first receiving antenna, $a_{12}$ represents a complex path gain from an input port of a second transmitting antenna to the output port of the first receiving antenna, $a_{21}$ represents a complex path gain from the input port of the first transmitting antenna to an output port of a second receiving antenna, $a_{22}$ represents a complex path gain from the input port of the second transmitting antenna to the output port of the second receiving antenna, G(tx_ant1,11) represents a gain from the first transmitting antenna to the first receiving antenna, G(rx_ant1,11) represents a gain from the first receiving antenna to the first transmitting antenna, $P_{11}$ represents a space path loss from the input port of the first transmitting antenna to the output port of the first receiving antenna, G(tx_ant1,21) represents a gain from the first transmitting antenna to the second receiving antenna, G(rx_ant2,21) represents a gain from the second receiving antenna to the first transmitting antenna, $P_{21}$ represents a space path loss from the input port of the first transmitting antenna to the output port of the second receiving antenna, G(tx_ant2,12) represents a gain from the second transmitting antenna to the first receiving antenna, G(rx_ant1,12) represents a gain from the first receiving antenna to the second transmitting antenna, $P_{12}$ represents a space path loss from the input port of the second transmitting antenna to the output port of the first receiving antenna, G(tx_ant2,22) represents a gain from the second transmitting antenna to the second receiving antenna, G(rx_ant2,22) represents a gain from the second receiving antenna to the second transmitting antenna, $P_{22}$ represents a space path loss from the input port of the second transmitting antenna to the output port of the second receiving antenna.

The method for testing the performance of the wireless terminal according to an embodiment of the present disclosure is same as a radiation loading method.

With the method for testing the performance of the wireless terminal according to an embodiment of the present disclosure, the real working conditions of the wireless terminal to be tested are maintained without increasing the cost. With the method for testing the performance of the wireless terminal according to an embodiment of the present disclosure, due to no additional cable, the processes of obtaining the antenna patterns and testing the information can be completed without interruption in the same working environment, thus simplifying the measurement process.

According to a second aspect of the present disclosure, a device for testing a performance of a wireless terminal is provided. The wireless terminal is placed in a first anechoic chamber and comprises m antennas, where m is a positive integer greater than 1. The device comprises: a first obtaining module, configured to obtain m pieces of antenna pattern information of the m antennas; a second obtaining module, configured to obtain n first testing signals according to the m pieces of antenna pattern information, where n is a positive integer greater than 1; a feeding module, configured to feed the n first testing signals to n testing antennas in the same or a second anechoic chamber, and to send the n first testing signals to the wireless terminal by the n testing antennas; and a fourth obtaining module, configured to obtain a piece of receiving information of the m antennas for the n first testing signals, and to obtain the performance of the wireless terminal according to the piece of receiving information.

In some embodiments, the second obtaining module is configured to: obtain m second testing signals according to the m pieces of antenna pattern information, n pieces of preset antenna pattern information of a base station of a multi-input multi-output system, and a spatial channel propagation model of the multi-input multi-output system; obtain the n first testing signals according to the m second testing signals and a testing channel transfer matrix.

In some embodiments, a relationship between the m second testing signals, the testing channel transfer matrix and the n first testing signals satisfies formula (1), $$\begin{bmatrix} S_1 \\ S_2 \\ \vdots \\ S_m \end{bmatrix} = \begin{bmatrix} a_{11} & a_{12} & \ldots & a_{1n} \\ a_{21} & a_{22} & \ldots & a_{2n} \\ & \vdots & & \\ a_{m1} & a_{m2} & \ldots & a_{mn} \end{bmatrix} \begin{bmatrix} MT_1 \\ MT_2 \\ \vdots \\ MT_n \end{bmatrix}, \quad (1)$$

$a_{ij} = G(\text{tx\_antj}, ij) = P_{ij} + G(\text{rx\_anti}, ij),$ $i = 1, 2, \ldots, m; j = 1, 2, \ldots, n$ where $MT_1$ to $MT_n$ represent the n first testing signals, $S_1$ to $S_m$ represent the m second testing signals, $a_{ij}$ represents a complex path gain from an input port of a $j^{th}$ transmitting antenna to an output port of an $i^{th}$ receiving antenna, G(tx_antj,ij) represents a gain from the $j^{th}$ transmitting antenna to the $i^{th}$ receiving antenna, G(rx_anti,ij) represents a gain from the $i^{th}$ receiving antenna to the $j^{th}$ transmitting antenna, $P_{ij}$ represents a space path loss from the input port of the $j^{th}$ transmitting antenna to the output port of the $i^{th}$ receiving antenna.

In some embodiments, n is greater than or equal to m.

In some embodiments, the n testing antennas and the wireless terminal remain still in the feeding module.

In some embodiments, the piece of receiving information is a throughput.

In some embodiments, the first anechoic chamber is the same as the second anechoic chamber.

In some embodiments, a part of the n testing antennas are vertically polarized antennas and the other part of the n testing antennas are horizontally polarized antennas.

In some embodiments, m is 2 and n is 2, the relationship between the two second testing signals and the two first testing signals satisfies formula (2), $$\begin{bmatrix} MT_1 \\ MT_2 \end{bmatrix} = \begin{bmatrix} a_{11} & a_{12} \\ a_{21} & a_{22} \end{bmatrix}^{-1} \begin{bmatrix} S_1 \\ S_2 \end{bmatrix}, \quad (2)$$

-continued $$a_{11} = G(\text{tx\_ant1}, 11) + P_{11} + G(\text{rx\_ant1}, 11)$$

$$a_{21} = G(\text{tx\_ant1}, 21) + P_{21} + G(\text{rx\_ant2}, 21)$$

$$a_{12} = G(\text{tx\_ant2}, 12) + P_{12} + G(\text{rx\_ant1}, 12)$$

$$a_{22} = G(\text{tx\_ant2}, 22) + P_{22} + G(\text{rx\_ant2}, 22)$$

where $MT_1$ and $MT_2$ represent the two first testing signals, $S_1$ and $S_2$ represent the two second testing signals, $a_{11}$ represents a complex path gain from an input port of a first transmitting antenna to an output port of a first receiving antenna, $a_{12}$ represents a complex path gain from an input port of a second transmitting antenna to the output port of the first receiving antenna, $a_{21}$ represents a complex path gain from the input port of the first transmitting antenna to an output port of a second receiving antenna, $a_{22}$ represents a complex path gain from the input port of the second transmitting antenna to the output port of the second receiving antenna, $G(\text{tx\_ant1},11)$ represents a gain from the first transmitting antenna to the first receiving antenna, $G(\text{rx\_ant1},11)$ represents a gain from the first receiving antenna to the first transmitting antenna, $P_{11}$ represents a space path loss from the input port of the first transmitting antenna to the output port of the first receiving antenna, $G(\text{tx\_ant1},21)$ represents a gain from the first transmitting antenna to the second receiving antenna, $G(\text{rx\_ant2},21)$ represents a gain from the second receiving antenna to the first transmitting antenna, $P_{21}$ represents a space path loss from the input port of the first transmitting antenna to the output port of the second receiving antenna, $G(\text{tx\_ant2},12)$ represents a gain from the second transmitting antenna to the first receiving antenna, $G(\text{rx\_ant1},12)$ represents a gain from the first receiving antenna to the second transmitting antenna, $P_{12}$ represents a space path loss from the input port of the second transmitting antenna to the output port of the first receiving antenna, $G(\text{tx\_ant2},22)$ represents a gain from the second transmitting antenna to the second receiving antenna, $G(\text{rx\_ant2},22)$ represents a gain from the second receiving antenna to the second transmitting antenna, $P_{22}$ represents a space path loss from the input port of the second transmitting antenna to the output port of the second receiving antenna.

With the device for testing the performance of the wireless terminal according to an embodiment of the present disclosure, the real working conditions of the wireless terminal to be tested are maintained without increasing the cost. With the device for testing the performance of the wireless terminal according to an embodiment of the present disclosure, due to no additional cable, the processes of obtaining the antenna patterns and testing the information can be completed without interruption in the same working environment, thus simplifying the measurement process.

According to a third aspect of the present disclosure, a computer readable storage medium is provided. The computer readable storage medium comprises a computer program for executing the method for testing the performance of the wireless terminal according to the first aspect of the present disclosure when running on a computer.

The above summary of the present disclosure is not intended to describe each disclosed embodiment or every implementation of the present disclosure. The Figures and the detailed descriptions which follow more particularly exemplify illustrative embodiments.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
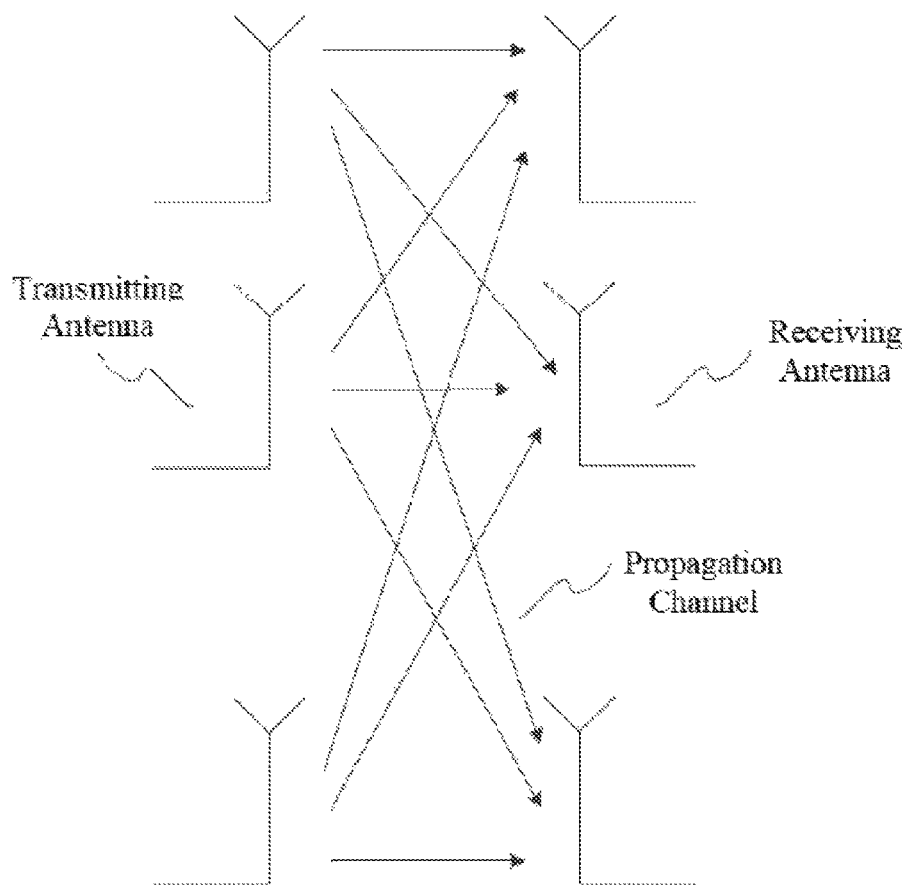
FIG. 1 is a schematic diagram of a multi-input multi-output (MIMO) antenna system.
Figure 2:
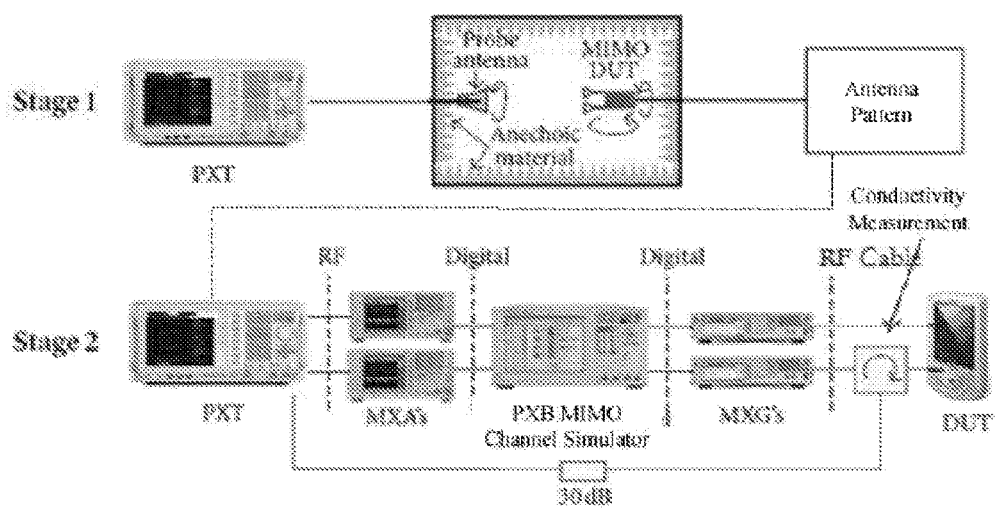
FIG. 2 is a schematic diagram of a testing system using a two-stage method.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

In the description of the present disclosure, a structure in which a first feature is "on" a second feature may include an embodiment in which the first feature directly contacts the second feature, and may also include an embodiment in which an additional feature is formed between the first feature and the second feature so that the first feature does not directly contact the second feature, unless specified otherwise. Furthermore, a first feature "on," "above," or "on top of" a second feature may include an embodiment in which the first feature is right "on," "above," or "on top of" the second feature, and may also include an embodiment in which the first feature is not right "on," "above," or "on top of" the second feature, or just means that the first feature is at a height higher than that of the second feature. While a first feature "beneath," "below," or "on bottom of" a second feature may include an embodiment in which the first feature is right "beneath," "below," or "on bottom of" the second feature, and may also include an embodiment in which the first feature is not right "beneath," "below," or "on bottom of" the second feature, or just means that the first feature is at a height lower than that of the second feature.

In the following, a method and a device for testing a performance of a wireless terminal according to embodiments of the present disclosure will be described in detail with reference to the drawings.

Figure 3:
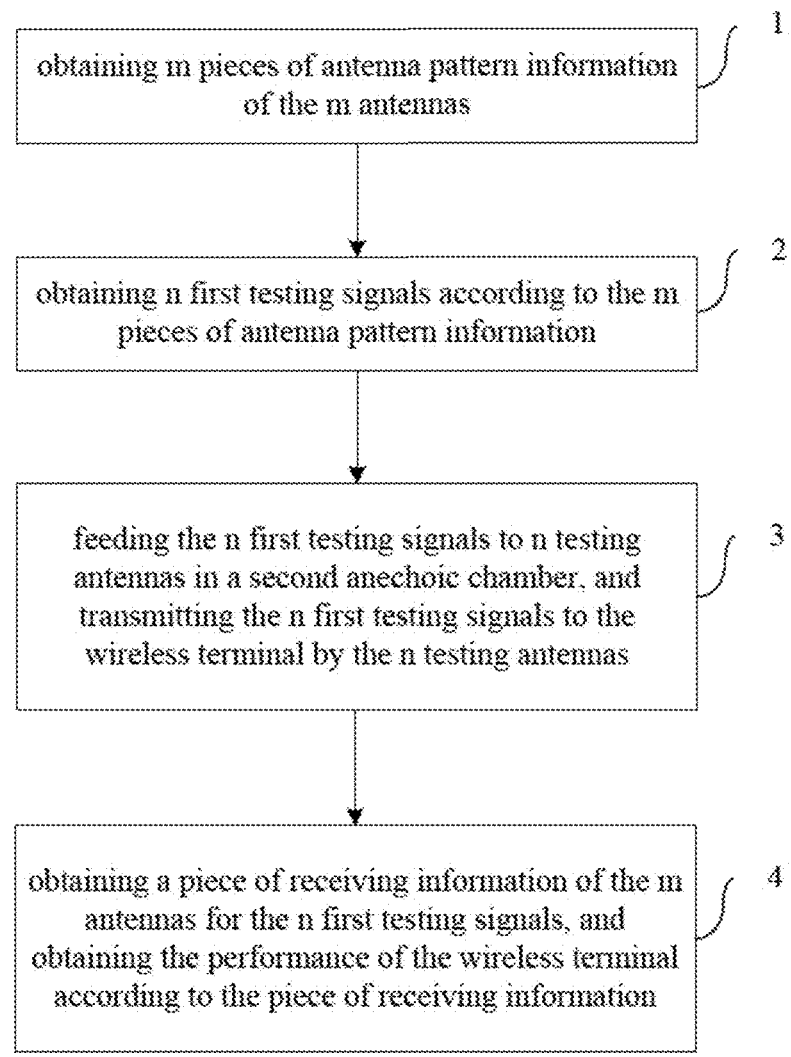
FIG. 3 is a flow chart of a method for testing a performance of a wireless terminal according to an embodiment of the present disclosure.

FIG. 3 is a flow chart of a method for testing a performance of a wireless terminal according to an embodiment of the present disclosure.

The wireless terminal is placed in a first anechoic chamber and comprises m antennas, where m is a positive integer greater than 1. As shown in FIG. 3, the method comprises the following steps.

In step 1, m pieces of antenna pattern information of the m antennas are obtained.

In one embodiment, a piece of antenna pattern information comprises an antenna pattern, a piece of gain information and a piece of phase information.

In one embodiment, the m pieces of gain information and the m pieces of phase information are obtained according to the m antenna patterns respectively.

In one embodiment, the m antenna patterns are obtained by testing in a second anechoic chamber. In one embodiment, the first anechoic chamber is the same as the second anechoic chamber.

In one embodiment, the testing system of the wireless terminal of the SISO antenna system can be used to test the wireless terminal which comprises m antennas.

In some embodiments, the m antennas are receiving antennas.

In the following, obtaining the m antenna patterns using the testing system of the wireless terminal of the SISO antenna system will be described in detail with reference to the drawings.

Figure 4A:
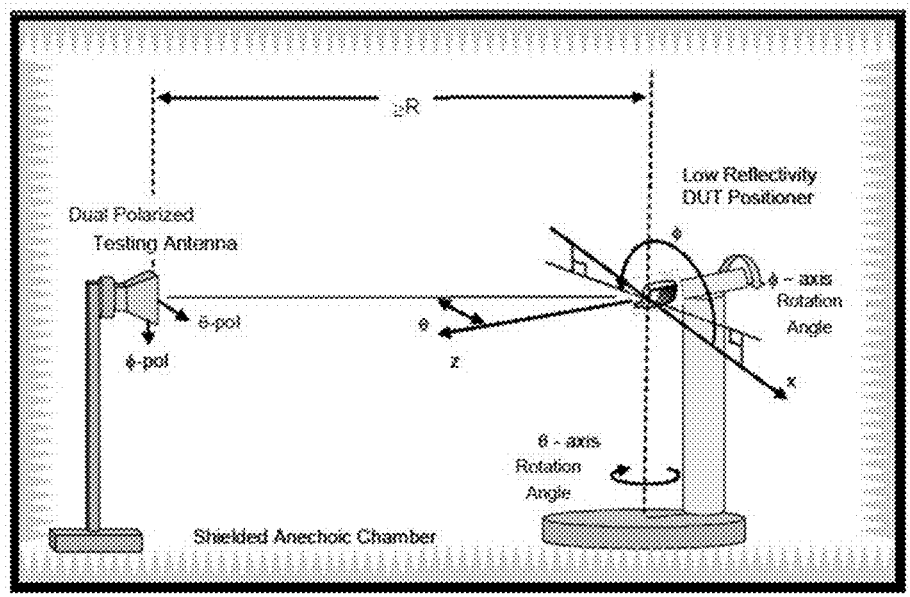
FIG. 4a is a schematic diagram of obtaining m antenna patterns according to an embodiment of the present disclosure.
Figure 4B:
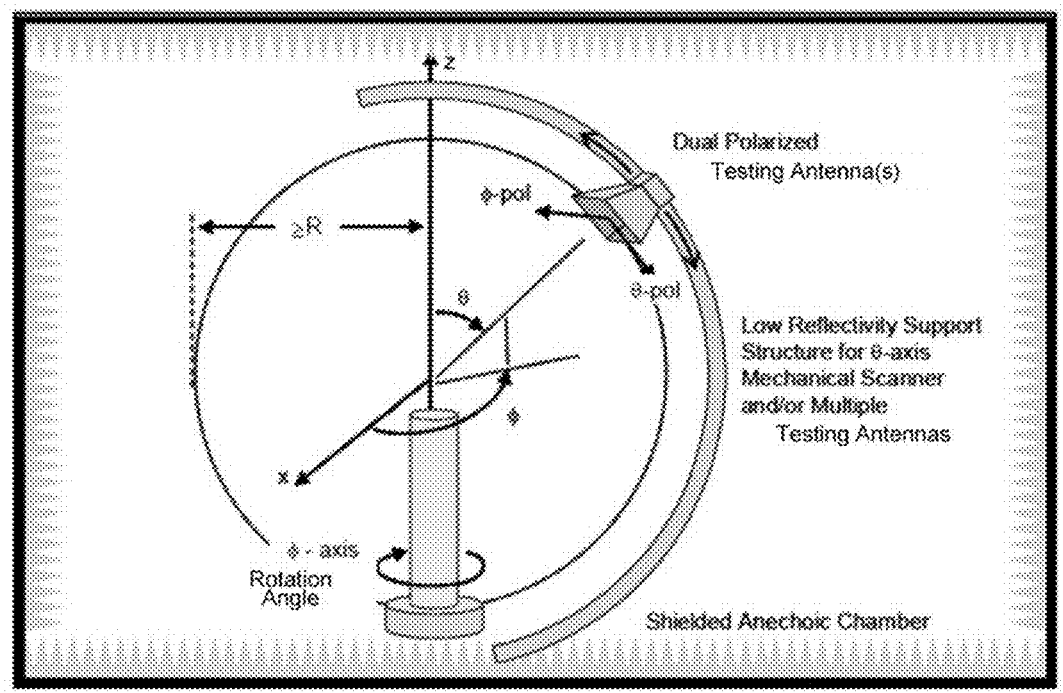
FIG. 4b is another schematic diagram of obtaining m antenna patterns according to an embodiment of the present disclosure.

FIG. 4a is a schematic diagram of obtaining the m antenna patterns according to an embodiment of the present disclosure, and FIG. 4b is another schematic diagram of obtaining the m antenna patterns according to an embodiment of the present disclosure.

As shown in FIG. 4a and FIG. 4b, the wireless terminal is placed in the rotary table of the shielded anechoic chamber. The rotary table is rotated when testing so that the wireless terminal is rotating, and then the testing antennas can obtain the transmitting and receiving characteristic of the wireless terminal in each spatial direction. Further, the antenna pattern, gain, polarization information and phase of each receiving antenna of the wireless terminal may be obtained.

Also, the wireless terminal can be placed in a variety of states, such as: free space, closing to the analog head, handing and so on. According to the user's needs, the performance of the wireless terminal in one placed state may be tested, or the performance of the wireless terminal in each placed state may be tested.

In step 2, n first testing signals are obtained according to the m pieces of antenna pattern information, where n is a positive integer greater than 1.

In one embodiment, n is greater than or equal to m.

In one embodiment, step 2 comprises the following steps:

In step 21: m second testing signals are obtained according to the m pieces of antenna pattern information, n pieces of preset antenna pattern information of a base station of a multi-input multi-output system, and a spatial channel propagation model of the multi-input multi-output system.

With step 21, once the antenna patterns of the wireless terminal are obtained, the antenna patterns can be used with different spatial channel propagation models and different scenes unless the wireless terminal is changed.

In step 21, the spatial channel propagation model can be described as the spatial channel model which is a geometric model and a simplified statistical of ray tracing method model. The specific environment of the spatial channel model does not need to be known, and the spatial channel model is primarily used in the link-level and system-level simulation of the MIMO antenna system. Scatterer groups are distributed around the base station and the wireless terminal according to some statistical characteristics. Each scatterer group is called one path in the spatial channel model, and each ray which is reflected, scattered or diffracted from the scatterer of each scatterer group to the receiving terminal is called one sub path. Each scatterer must meet the angle power delay spectrum, and then the angle, delay and other channel parameters of each ray are determined by the ray tracing method. The superposition of the response of each ray results in the impulse response of the spatial channel.

Figure 5:
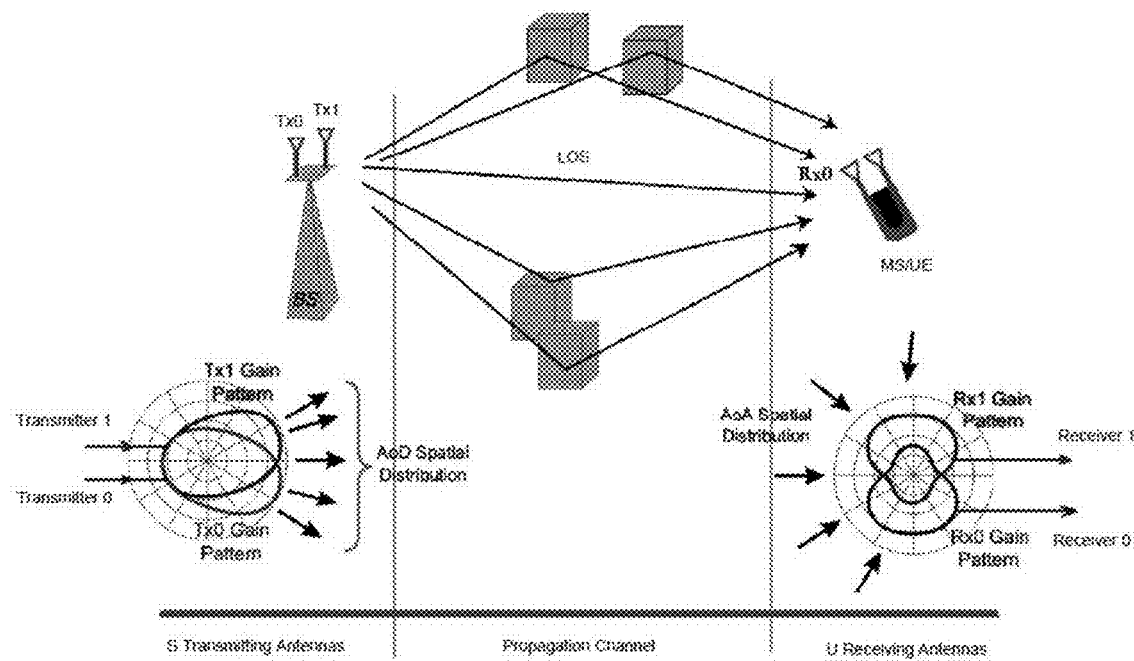
FIG. 5 is a schematic diagram of an MIMO antenna system according to an embodiment of the present disclosure.

FIG. 5 is a schematic diagram of an MIMO antenna system according to an embodiment of the present disclosure. As shown in FIG. 5, in the U×S MIMO spatial channels, there is U receiving antennas and S transmitting antennas, and the impulse response matrix satisfies formula (3):

$$H(t, \tau) = \sum_{n=1}^{N} H_n(t, \tau) \quad (3)$$

where t represents a time, τ represents a delay, and N represents a number of the paths. The impulse response matrix comprises the impulse response matrix $F_{rx}$ of the U receiving antennas and the impulse response matrix $F_{rx}$ of the S transmitting antennas.

The spatial transmission channel from the transmitting antennas to the receiving antennas satisfies formula (4):

$$H_{u,s,n}(t;\tau) = \sum_{m=1}^{M} \begin{bmatrix} F_{rx,u,V}(\varphi_{n,m}) \\ F_{rx,u,H}(\varphi_{n,m}) \end{bmatrix}^T \begin{bmatrix} a_{n,m,VV}, & a_{n,m,VH} \\ a_{n,m,HV}, & a_{n,m,HH} \end{bmatrix} \begin{bmatrix} F_{tx,u,V}(\varphi_{n,m}) \\ F_{tx,u,H}(\varphi_{n,m}) \end{bmatrix} \times$$

$$\exp(j2\pi\lambda_0^{-1}(\overline{\varphi}_{n,m} \cdot \overline{r}_{rx,u}))$$

$$\exp(j2\pi\lambda_0^{-1}(\overline{\phi}_{n,m} \cdot \overline{r}_{tx,s})) \times \exp(j2\pi v_{n,m} t)\delta(t - t_{n,m})$$

where $F_{rx,u,V}$ represents a vertically polarized antenna pattern of the receiving antenna u and $F_{rx,u,H}$ represents a horizontally polarized antenna pattern of the receiving antenna u, $F_{tx,s,V}$ represents a vertically polarized antenna pattern of the transmitting antenna s, $F_{tx,s,H}$ represents a horizontally polarized antenna pattern of the transmitting antenna s, $a_{n,m,VV}$ represents a complex gain from the vertical propagation path to the vertical propagation path of the sub path (n,m), represents a complex gain from the vertical propagation path to the horizontal propagation path of the sub path (n,m), $a_{n,m,HV}$ represents a complex gain from the horizontal propagation path to the vertical propagation path of the sub path (n,m), $a_{n,m,HH}$ represents a complex gain from the horizontal propagation path to the horizontal propagation path of the sub path (n,m), $\lambda_0$ represents a carrier wavelength, $\overline{\phi}_{n,m}$ represents an unit vector of angle of departure (AoD), $\overline{\phi}_{n,m}$ represents an unit vector of angle of arrival (AoA), $\overline{r}_{rx,u}$ represents a position vector of the receiving antenna u, $\overline{r}_{tx,s}$ represents the position vector of the transmitting antenna s, $v_{n,m}$ represents a Doppler shift component of the sub path (n,m).

In one embodiment, the piece of receiving information is a throughput. For the throughput of the downlink of the MIMO antenna system, $F_{rx,u,V}$ and $F_{rx,u,H}$ are the antenna patterns obtained in step 1, $F_{tx,s,V}$ and $F_{tx,s,H}$ are the antenna patterns of a base station which are known. For the throughput of the uplink of the MIMO antenna system, $F_{tx,s,V}$ and $F_{tx,s,H}$ are the antenna patterns obtained in step 1, $F_{rx,u,V}$ and $F_{rx,u,H}$ are the antennas pattern of a base station which are known.

As shown in FIG. 5, a wireless transmission channel comprises transmitting antennas, a propagation channel and receiving antennas. Transmitters send signals to the transmitting antennas, and the antenna patterns of the transmitting antennas are known. The radiation signals from the transmitting antennas enter into the propagation channel and the propagation channel can be simulated by the channel simulator. Then, the radiation signals can be received by the receiving antennas, also the receiving antennas are known. Therefore, a propagation model is obtained by combining the receiving antennas, the transmitting antennas and the spatial channel propagation model. Then, the m second testing signals can be obtained according to the propagation model.

In step 22: the n first testing signals are obtained according to the m second testing signals and a testing channel transfer matrix.

In one embodiment, the testing channel transfer matrix is also called the relative correction matrix which contains relative position between the first anechoic chamber (as shown in the following embodiment) and the wireless terminal.

In one embodiment, a relationship between the m second testing signals, the testing channel transfer matrix and the n first testing signals satisfies formula (1), $$\begin{bmatrix} S_1 \\ S_2 \\ \vdots \\ S_m \end{bmatrix} = \begin{bmatrix} a_{11} & a_{12} & \ldots & a_{1n} \\ a_{21} & a_{22} & \ldots & a_{2n} \\ & \vdots & & \\ a_{m1} & a_{m2} & \ldots & a_{mn} \end{bmatrix} \begin{bmatrix} MT_1 \\ MT_2 \\ \vdots \\ MT_n \end{bmatrix}, \quad (1)$$

$$a_{ij} = G(tx\_antj, ij) + P_{ij} + G(rx\_anti, ij),$$

$$i = 1, 2, \ldots, m; j = 1, 2, \ldots, n$$

where $MT_1$ to $MT_n$ represent the n first testing signals, $S_1$ to $S_m$ represent the m second testing signals, $a_{ij}$ represents a complex path gain from an input port of a $j^{th}$ transmitting antenna to an output port of an $i^{th}$ receiving antenna, $G(tx\_antj,ij)$ represents a gain from the $j^{th}$ transmitting antenna to the $i^{th}$ receiving antenna, $G(rx\_anti,ij)$ represents a gain from the $i^{th}$ receiving antenna to the $j^{th}$ transmitting antenna, $P_{ij}$ represents a space path loss from the input port of the $j^{th}$ transmitting antenna to the output port of the $i^{th}$ receiving antenna.

In step 3: the n first testing signals are fed to n testing antennas in the same or the second anechoic chamber, and the n first testing signals are sent to the wireless terminal by the n testing antennas for testing the performance of the wireless terminal.

In some embodiments, the n testing antennas are transmitting antennas.

In one embodiment, the n testing antennas and the wireless terminal remain still in step 3.

In step 4: a piece of receiving information of the m antennas for the n first testing signals is obtained, and the performance of the wireless terminal is obtained according to the piece of receiving information.

The method for testing the performance of the wireless terminal according to an embodiment of the present disclosure is the same as a radiation loading method.

Figure 6:
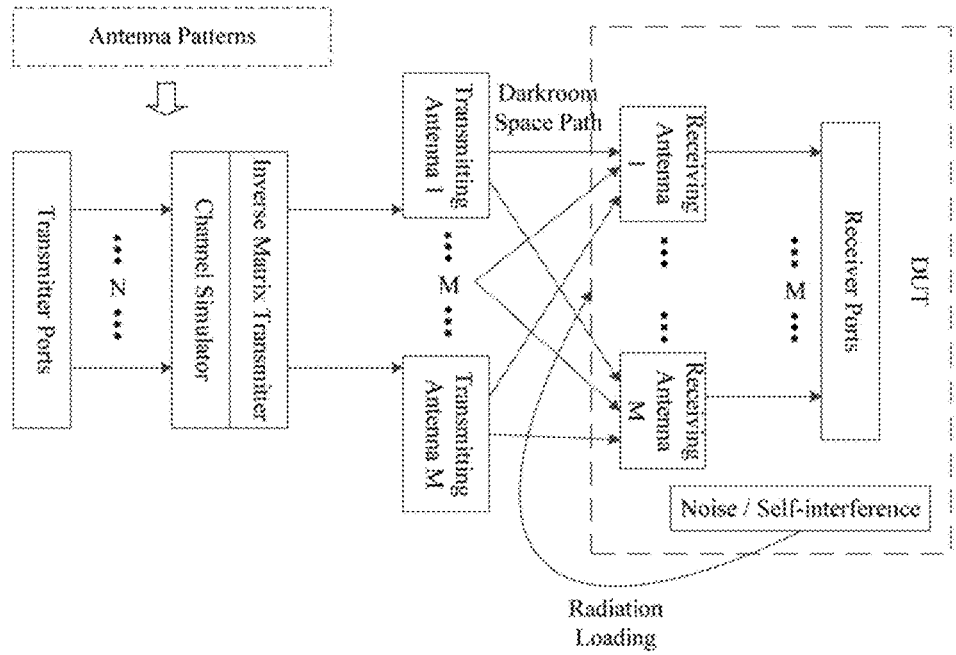
FIG. 6 is a schematic diagram of a radiation loading method according to an embodiment of the present disclosure.

FIG. 6 is a schematic diagram of a radiation loading method according to an embodiment of the present disclosure. As shown in FIG. 6, the radiation loading method uses wireless transmission instead of conducting cable. If the signals generated by the channel simulator are directly sent to the receivers' ports by wireless transmission, the signals received by the receivers will be changed due to physical factors, such as the mutual influence between the transmitting antennas, the spatial propagation channels and the receiving antennas, the loss of the spatial propagation channels and so on. In order to ensure that the signals received by the input ports of the wireless terminal are equal to the signals sent from the channel simulator; the signals will be processed via an inverse testing channel transfer matrix.

With the method for testing the performance of the wireless terminal according to an embodiment of the present disclosure, the real working conditions of the wireless terminal to be tested are maintained without increasing the cost.

With the method for testing the performance of the wireless terminal according to an embodiment of the present disclosure, due to no additional cable, the processes of obtaining the antenna patterns and testing the information can be completed without interruption in the same working environment, thus simplifying the measurement process.

In one embodiment, the MIMO antenna system can comprise: a first receiving antenna (receiver 1), a second receiving antenna (receiver 2), a first transmitting antenna (transmitter 1) and a second transmitting antenna (transmitter 2), so m is 2 and n is 2, the relationship between the two second testing signals and the two first testing signals satisfies formula (2):

$$\begin{bmatrix} MT_1 \\ MT_2 \end{bmatrix} = \begin{bmatrix} a_{11} & a_{12} \\ a_{21} & a_{22} \end{bmatrix}^{-1} \begin{bmatrix} S_1 \\ S_2 \end{bmatrix}, \quad (2)$$

$a_{11} = G(\text{tx\_ant1}, 11) + P_{11} + G(\text{rx\_ant1}, 11)$ $a_{21} = G(\text{tx\_ant1}, 21) + P_{21} + G(\text{rx\_ant2}, 21)$ $a_{12} = G(\text{tx\_ant2}, 12) + P_{12} + G(\text{rx\_ant1}, 12)$ $a_{22} = G(\text{tx\_ant2}, 22) + P_{22} + G(\text{rx\_ant2}, 22)$ where $MT_1$ and $MT_2$ represent the two first testing signals, $S_1$ and $S_2$ represent the two second testing signals, $a_{11}$ represents a complex path gain from an input port of a first transmitting antenna to an output port of a first receiving antenna, $a_{12}$ represents a complex path gain from an input port of a second transmitting antenna to the output port of the first receiving antenna, $a_{21}$ represents a complex path gain from the input port of the first transmitting antenna to an output port of a second receiving antenna, $a_{22}$ represents a complex path gain from the input port of the second transmitting antenna to the output port of the second receiving antenna, $G(\text{tx\_ant1},11)$ represents a gain from the first transmitting antenna to the first receiving antenna, $G(\text{rx\_ant1},11)$ represents a gain from the first receiving antenna to the first transmitting antenna, $P_{11}$ represents a space path loss from the input port of the first transmitting antenna to the output port of the first receiving antenna, $G(\text{tx\_ant1},21)$ represents a gain from the first transmitting antenna to the second receiving antenna, $G(\text{rx\_ant2},21)$ represents a gain from the second receiving antenna to the first transmitting antenna, $P_{21}$ represents a space path loss from the input port of the first transmitting antenna to the output port of the second receiving antenna, $G(\text{tx\_ant2},12)$ represents a gain from the second transmitting antenna to the first receiving antenna, $G(\text{rx\_ant1},12)$ represents a gain from the first receiving antenna to the second transmitting antenna, $P_{12}$ represents a space path loss from the input port of the second transmitting antenna to the output port of the first receiving antenna, $G(\text{tx\_ant2},22)$ represents a gain from the second transmitting antenna to the second receiving antenna, $G(\text{rx\_ant2},22)$ represents a gain from the second receiving antenna to the second transmitting antenna, $P_{22}$ represents a space path loss from the input port of the second transmitting antenna to the output port of the second receiving antenna.

Figure 7:
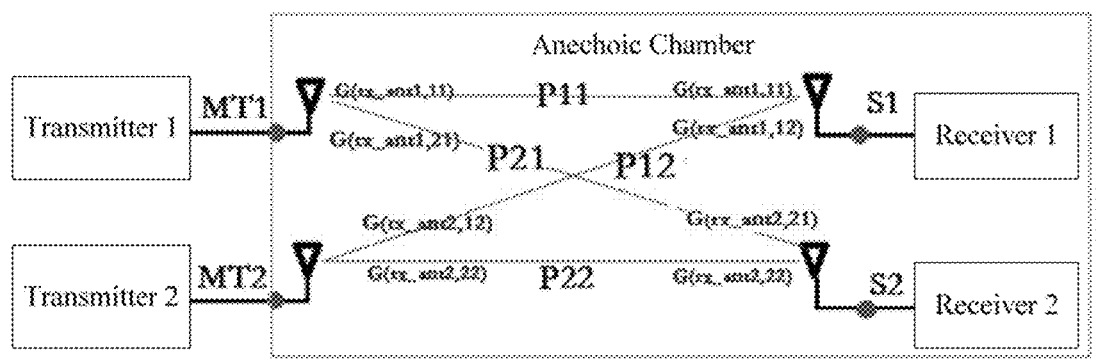
FIG. 7 is a schematic diagram of an MIMO antenna system (m=2, n=2) according to an embodiment of the present disclosure.
Figure 8:
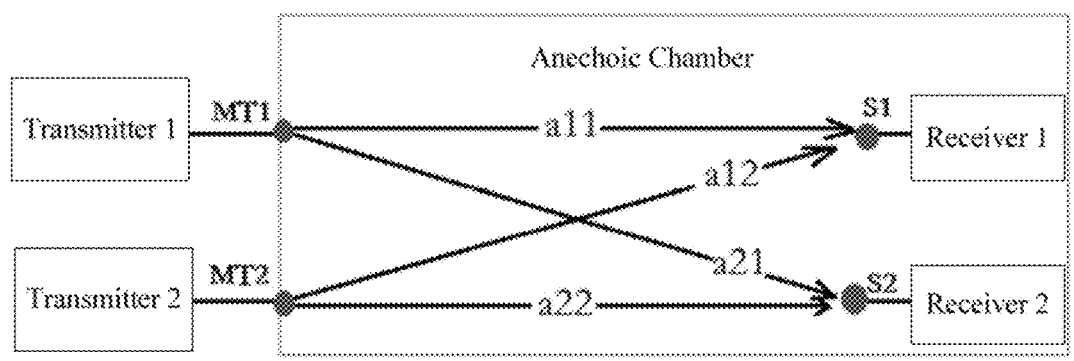
FIG. 8 is another schematic diagram of an MIMO antenna system (m=2, n=2) according to an embodiment of the present disclosure.
Figure 9:
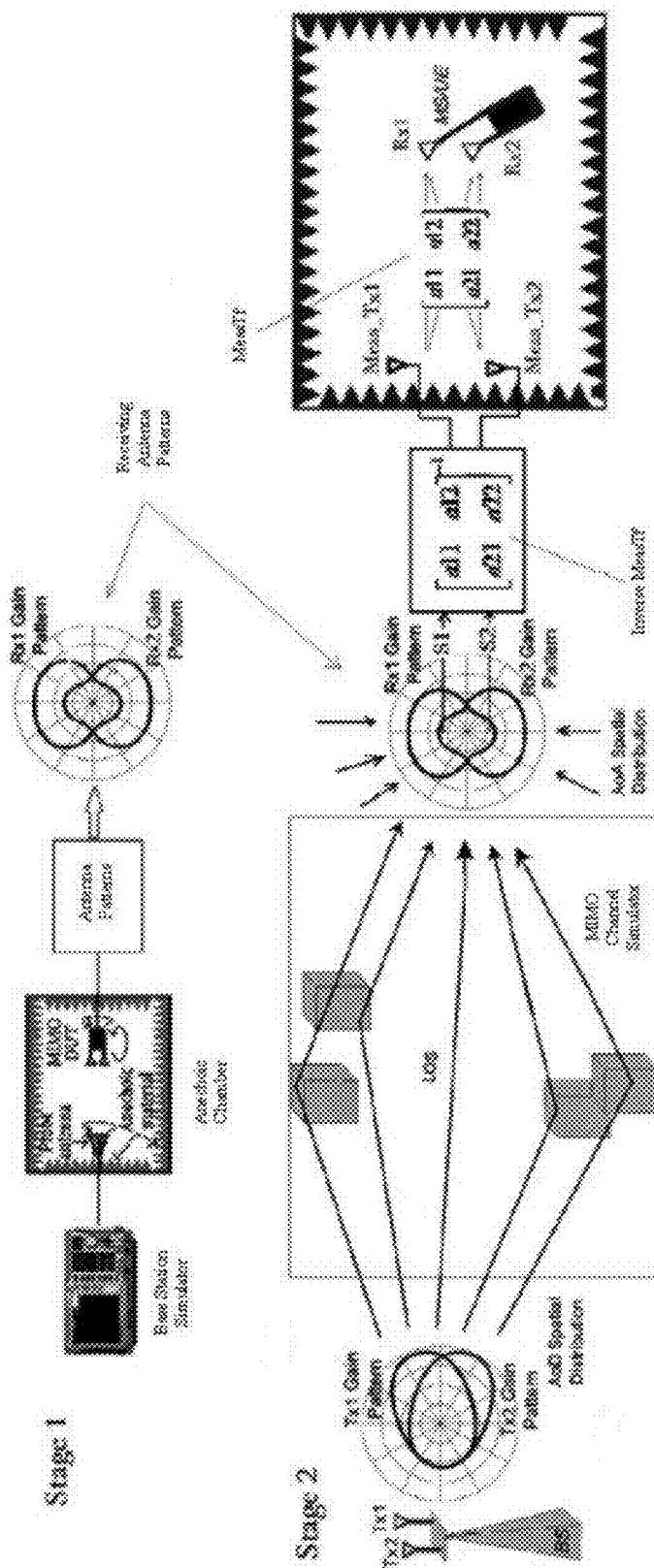
FIG. 9 is a working diagram of an MIMO antenna system (m=2, n=2) according to an embodiment of the present disclosure.

FIG. 7 is a schematic diagram of an MIMO antenna system (m=2, n=2) according to an embodiment of the present disclosure. FIG. 8 is another schematic diagram of an of MIMO antenna system (m=2, n=2) according to an embodiment of the present disclosure. FIG. 9 is a working diagram of an MIMO antenna system (m=2, n=2) according to an embodiment of the present disclosure.

Specifically, as shown in the FIG. 7, FIG. 8, and FIG. 9, the first anechoic chamber comprises 2 testing antennas (that is, 2 transmitting antennas), and the two first testing signals are fed to the 2 testing antennas and sent to the wireless terminal by the 2 testing antennas. $MT_1$ and $MT_2$ arrive at the input port of the wireless terminal via 2 testing antennas, the propagation channel in the first anechoic chamber, and the 2 receiving antennas of the wireless terminal.

In one embodiment, the inverse testing channel transfer matrix is $$\text{MeasTf} = \begin{bmatrix} a_{11} & a_{12} \\ a_{21} & a_{22} \end{bmatrix}^{-1}.$$

In one embodiment, the inverse testing channel transfer matrix is simulated by the baseband, also by the channel simulator. In one embodiment, the inverse testing channel transfer matrix is simulated by RF.

In one embodiment, a part of the n testing antennas are vertically polarized antennas and the other part of the n testing antennas are horizontally polarized antennas.

The present disclosure also provides a device for testing a performance of a wireless terminal.

Figure 10:
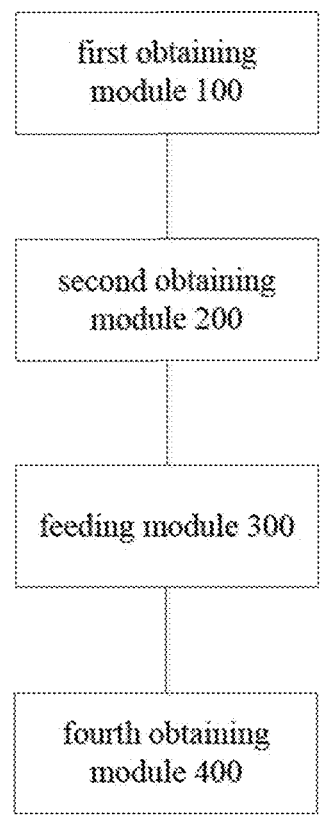
FIG. 10 is a block diagram of a device for testing a performance of a wireless terminal according to an embodiment of the present disclosure.

FIG. 10 is a block diagram of a device for testing a performance of a wireless terminal according to an embodiment of the present disclosure.

As show in FIG. 10, the device comprises a first obtaining module 100, a second obtaining module 200, a feeding module 300 and a fourth obtaining module 400. The wireless terminal is placed in a first anechoic chamber and comprises m antennas, where m is a positive integer greater than 1.

Specifically, the first obtaining module 100 is configured to obtain m pieces of antenna pattern information of the m antennas.

In one embodiment, a piece of antenna pattern information comprises an antenna pattern, a piece of gain information and a piece of phase information.

In one embodiment, the m pieces of gain information and the m pieces of phase information are obtained according to the m antenna patterns respectively.

In one embodiment, the m antenna patterns are obtained by testing in a second anechoic chamber. In one embodiment, the first anechoic chamber is the same as the second anechoic chamber.

In one embodiment, the testing system of the wireless terminal of the SISO antenna system can be used to test the wireless terminal which comprises m antennas.

In some embodiments, the m antennas are receiving antennas.

The second obtaining module 200 is configured to obtain n first testing signals according to the m pieces of antenna pattern information, where n is a positive integer greater than 1.

In one embodiment, the second obtaining module 200 is configured to obtain m second testing signals according to the m pieces of antenna pattern information, n pieces of preset antenna pattern information of a base station of a multi-input multi-output system, and a spatial channel propagation model of the multi-input multi-output system, and to obtain the n first testing signals according to the m second testing signals and a testing channel transfer matrix. Concerning the process of obtaining the m second testing signals and the n first testing signals, reference is made to the foregoing embodiments.

The feeding module 300 is configured to feed the n first testing signals to n testing antennas in the same or a second anechoic chamber, and to send the n first testing signals to the wireless terminal by the n testing antennas for testing the performance of the wireless terminal.

The fourth obtaining module 400 is configured to obtain a piece of receiving information of the m antennas for the n first testing signals, and to obtain the performance of the wireless terminal according to the piece of receiving information.

In one embodiment, the first anechoic chamber is the same as the second anechoic chamber.

In the following, obtaining the m antenna patterns using the testing system of the wireless terminal of the SISO antenna system will be described in detail with reference to the drawings.

As shown in FIG. 4a and FIG. 4b, the wireless terminal is placed in the rotary table of the shielded anechoic chamber. The rotary table is rotated when testing so that the wireless terminal is rotating, and then the testing antennas can obtain the transmitting and receiving characteristic of the wireless terminal in each spatial direction. Further, the antenna pattern, gain, polarization information and phase of each receiving antenna of the wireless terminal may be obtained.

Also, the wireless terminal can be placed in a variety of states, such as: free space, closing to the analog head, handing and so on. According to the user's needs, the performance of the wireless terminal in one placed state may be tested, or the performance of the wireless terminal in each placed state may be tested.

The n first testing signals are obtained according to the m pieces of antenna pattern information, where n is a positive integer greater than 1.

In one embodiment, n is greater than or equal to m.

The m second testing signals are obtained according to the m pieces of antenna pattern information, n pieces of preset antenna pattern information of a base station of a multi-input multi-output system, and a spatial channel propagation model of the multi-input multi-output system.

Once the antenna patterns of the wireless terminal are obtained, the antenna patterns can be used with different spatial channel propagation models and different scenes unless the wireless terminal is changed.

The spatial channel propagation model can be described as the spatial channel model which is a geometric model and a simplified statistical of ray tracing method model. The specific environment of the spatial channel model does not need to be known, and the spatial channel model is primarily used in the link-level and system-level simulation of the MIMO antenna system. Scatterer groups are distributed around the base station and the wireless terminal according to some statistical characteristics. Each scatterer group is called one path in the spatial channel model, and each ray which is reflected, scattered or diffracted from the scatterer of each scatterer group to the receiving terminal is called one sub path. Each scatterer must meet the angle power delay spectrum, and then the angle, delay and other channel parameters of each ray are determined by the ray tracing method. The superposition of the response of each ray results in the impulse response of the spatial channel.

As shown in FIG. 5, in the U×S MIMO spatial channels, there is U receiving antennas and S transmitting antennas, and the impulse response matrix satisfies formula (3):

$$H(t; \tau) = \sum_{n=1}^{N} H_n(t; \tau) \tag{3}$$

where t represents a time, $\tau$ represents a delay, and N represents a number of the paths.

The impulse response matrix comprises the impulse response matrix $F_{tx}$ of the U receiving antennas and the impulse response matrix $F_{rx}$ of the S transmitting antennas.

The spatial transmission channel from the transmitting antennas to the receiving antennas satisfies formula (4):

$$H_{u,s,n}(t; \tau) = \tag{4}$$

$$\sum_{m=1}^{M} \begin{bmatrix} F_{rx,u,V}(\varphi_{n,m}) \\ F_{rx,u,H}(\varphi_{n,m}) \end{bmatrix}^T \begin{bmatrix} a_{n,m,VV}, & a_{n,m,VH} \\ a_{n,m,HV}, & a_{n,m,HH} \end{bmatrix} \begin{bmatrix} F_{tx,u,V}(\varphi_{n,m}) \\ F_{tx,u,H}(\varphi_{n,m}) \end{bmatrix} \times$$

$$\exp(j2\pi\lambda_0^{-1}(\bar{\varphi}_{n,m} \cdot \bar{r}_{rx,u}))$$
$$\exp(j2\pi\lambda_0^{-1}(\bar{\phi}_{n,m} \cdot \bar{r}_{tx,s})) \times \exp(j2\pi v_{n,m}t)\delta(t - t_{n,m})$$

where $F_{rx,u,V}$ represents a vertically polarized antenna pattern of the receiving antenna u and $F_{rx,u,H}$ represents a horizontally polarized antenna pattern of the receiving antenna u, $F_{tx,s,V}$ represents a vertically polarized antenna pattern of the transmitting antenna s, $F_{tx,s,H}$ represents a horizontally polarized antenna pattern of the transmitting antenna s, $a_{n,m,VV}$ represents a complex gain from the vertical propagation path to the vertical propagation path of the sub path (n,m), $a_{n,m,VH}$ represents a complex gain from the vertical propagation path to the horizontal propagation path of the sub path (n,m), $a_{n,m,HV}$ represents a complex gain from the horizontal propagation path to the vertical propagation path of the sub path (n,m), $a_{n,m,HH}$ represents a complex gain from the horizontal propagation path to the horizontal propagation path of the sub path (n,m), $\lambda_0$ represents a carrier wavelength, $\bar{\phi}_{n,m}$ represents an unit vector of angle of departure (AoD), $\bar{\varphi}_{n,m}$ represents an unit vector of angle of arrival (AoA), $\bar{r}_{rx,u}$ represents a position vector of the receiving antenna u, $\bar{r}_{tx,s}$ represents the position vector of the transmitting antenna s, $v_{n,m}$ represents a Doppler shift component of the sub path (n,m).

In one embodiment, the piece of receiving information is a throughput. For the throughput of the downlink of the MIMO antenna system, $F_{rx,u,V}$ and $F_{rx,u,H}$ are the antenna patterns obtained, $F_{tx,s,V}$ and $F_{tx,s,H}$ are the antenna patterns of a base station which are known. For the throughput of the uplink of the MIMO antenna system, $F_{tx,s,V}$ and $F_{tx,s,H}$ are the antenna patterns obtained, $F_{rx,u,V}$ and $F_{rx,u,H}$ are the antennas pattern of a base station which are known.

As shown in FIG. 5, a wireless transmission channel comprises transmitting antennas, a propagation channel and receiving antennas. Transmitters send signals to the transmitting antennas, and the antenna patterns of the transmitting antennas are known. The radiation signals from the transmitting antennas enter into the propagation channel and the propagation channel can be simulated by the channel simulator. Then, the radiation signals can be received by the receiving antennas, also the receiving antennas are known. Therefore, a propagation model is obtained by combining the receiving antennas, the transmitting antennas and the spatial channel propagation model. Then, the m second testing signals can be obtained according to the propagation model.

The n first testing signals are obtained according to the m second testing signals and a testing channel transfer matrix.

In one embodiment, the testing channel transfer matrix is also called the relative correction matrix which contains relative position between the first anechoic chamber (as shown in the following embodiment) and the wireless terminal.

In one embodiment, a relationship between the m second testing signals, the testing channel transfer matrix and the n first testing signals satisfies formula (1), $$\begin{bmatrix} S_1 \\ S_2 \\ \vdots \\ S_m \end{bmatrix} = \begin{bmatrix} a_{11} & a_{12} & \ldots & a_{1n} \\ a_{21} & a_{22} & \ldots & a_{2n} \\ & \vdots & & \\ a_{m1} & a_{m2} & \ldots & a_{mn} \end{bmatrix} \begin{bmatrix} MT_1 \\ MT_2 \\ \vdots \\ MT_n \end{bmatrix}, \quad (1)$$

$$a_{ij} = G(\text{tx\_ant}j, ij) + P_{ij} + G(\text{rx\_ant}i, ij),$$

$$i = 1, 2, \ldots, m; j = 1, 2, \ldots, n$$

where $MT_1$ to $MT_n$ represent the n first testing signals, $S_1$ to $S_m$ represent the m second testing signals, $a_{ij}$ represents a complex path gain from an input port of a $j^{th}$ transmitting antenna to an output port of an $i^{th}$ receiving antenna, $G(\text{tx\_ant}j,ij)$ represents a gain from the $j^{th}$ transmitting antenna to the $i^{th}$ receiving antenna, $G(\text{rx\_ant}i,ij)$ represents a gain from the $i^{th}$ receiving antenna to the $j^{th}$ transmitting antenna, $P_{ij}$ represents a space path loss from the input port of the $j^{th}$ transmitting antenna to the output port of the $i^{th}$ receiving antenna.

The n first testing signals are fed to n testing antennas in the second anechoic chamber, and the n first testing signals are sent to the wireless terminal by the n testing antennas for testing the performance of the wireless terminal.

In some embodiments, the n testing antennas are transmitting antennas.

In one embodiment, the n testing antennas and the wireless terminal remain still in the feeding module 300.

The method for testing the performance of the wireless terminal according to an embodiment of the present disclosure is the same as a radiation loading method.

As shown in FIG. 6, the radiation loading method uses wireless transmission instead of conducting cable. If the signals generated by the channel simulator are directly sent to the receivers' ports by wireless transmission, the signals received by the receivers will be changed due to physical factors, such as the mutual influence between the transmitting antennas, the spatial propagation channels and the receiving antennas, the loss of the spatial propagation channels and so on. In order to ensure that the signals received by the input ports of the wireless terminal are equal to the signals sent from the channel simulator; the signals will be processed via an inverse testing channel transfer matrix.

In one embodiment, the MIMO antenna system can comprise: a first receiving antenna (receiver 1), a second receiving antenna (receiver 2), a first transmitting antenna (transmitter 1) and a second transmitting antenna (transmitter 2), so m is 2 and n is 2, the relationship between the two second testing signals and the two first testing signals satisfies formula (2):

$$\begin{bmatrix} MT_1 \\ MT_2 \end{bmatrix} = \begin{bmatrix} a_{11} & a_{12} \\ a_{21} & a_{22} \end{bmatrix}^{-1} \begin{bmatrix} S_1 \\ S_2 \end{bmatrix}, \quad (2)$$

$$a_{11} = G(\text{tx\_ant1}, 11) + P_{11} + G(\text{rx\_ant1}, 11)$$

$$a_{21} = G(\text{tx\_ant1}, 21) + P_{21} + G(\text{rx\_ant2}, 21)$$

$$a_{12} = G(\text{tx\_ant2}, 12) + P_{12} + G(\text{rx\_ant1}, 12)$$

$$a_{22} = G(\text{tx\_ant2}, 22) + P_{22} + G(\text{rx\_ant2}, 22)$$

where $MT_1$ and $MT_2$ represent the two first testing signals, $S_1$ and $S_2$ represent the two second testing signals, $a_{11}$ represents a complex path gain from an input port of a first transmitting antenna to an output port of a first receiving antenna, $a_{12}$ represents a complex path gain from an input port of a second transmitting antenna to the output port of the first receiving antenna, $a_{21}$ represents a complex path gain from the input port of the first transmitting antenna to an output port of a second receiving antenna, $a_{22}$ represents a complex path gain from the input port of the second transmitting antenna to the output port of the second receiving antenna, $G(\text{tx\_ant1},11)$ represents a gain from the first transmitting antenna to the first receiving antenna, $G(\text{rx\_ant1},11)$ represents a gain from the first receiving antenna to the first transmitting antenna, $P_{11}$ represents a space path loss from the input port of the first transmitting antenna to the output port of the first receiving antenna, $G(\text{tx\_ant1},21)$ represents a gain from the first transmitting antenna to the second receiving antenna, $G(\text{rx\_ant2},21)$ represents a gain from the second receiving antenna to the first transmitting antenna, $P_{21}$ represents a space path loss from the input port of the first transmitting antenna to the output port of the second receiving antenna, $G(\text{tx\_ant2},12)$ represents a gain from the second transmitting antenna to the first receiving antenna, $G(\text{rx\_ant1},12)$ represents a gain from the first receiving antenna to the second transmitting antenna, $P_{12}$ represents a space path loss from the input port of the second transmitting antenna to the output port of the first receiving antenna, $G(\text{tx\_ant2},22)$ represents a gain from the second transmitting antenna to the second receiving antenna, $G(\text{rx\_ant2},22)$ represents a gain from the second receiving antenna to the second transmitting antenna, $P_{22}$ represents a space path loss from the input port of the second transmitting antenna to the output port of the second receiving antenna.

Specifically, as shown in the FIG. 7, FIG. 8, and FIG. 9, the first anechoic chamber comprises 2 testing antennas (that is, 2 transmitting antennas), and the two first testing signals are fed to the 2 testing antennas and sent to the wireless terminal by the 2 testing antennas. $MT_1$ and $MT_2$ arrive at the input port of the wireless terminal via 2 testing antennas, the propagation channel in the first anechoic chamber, and the 2 receiving antennas of the wireless terminal.

In one embodiment, the inverse testing channel transfer matrix is $$MeasTf = \begin{bmatrix} a_{11} & a_{12} \\ a_{21} & a_{22} \end{bmatrix}^{-1}.$$

In one embodiment, the inverse testing channel transfer matrix is simulated by the baseband, also by the channel simulator. In one embodiment, the inverse testing channel transfer matrix is simulated by RF.

In one embodiment, a part of the n testing antennas are vertically polarized antennas and the other part of the n testing antennas are horizontally polarized antennas.

With the device for testing the performance of the wireless terminal according to an embodiment of the present disclosure, the real working conditions of the wireless terminal to be tested are maintained without increasing the cost. With the device for testing the performance of the wireless terminal according to an embodiment of the present disclosure, due to no additional cable, the processes of obtaining the antenna patterns and testing the information can be completed without interruption in the same working environment, thus simplifying the measurement process.

According to an embodiment of the present disclosure, a computer readable storage medium is provided. The computer readable storage medium comprises a computer program for executing the method for testing the performance of the wireless terminal described above when running on a computer.

Any process or method described in the flowing diagram or other means may be understood as a module, segment or portion including one or more executable instruction codes of the procedures configured to achieve a certain logic function or process, and the preferred embodiments of the present disclosure include other performances, in which the performance may be achieved in other orders instead of the order shown or discussed, such as in a almost simultaneous way or in an opposite order, which should be appreciated by those having ordinary skills in the art to which embodiments of the present disclosure belong.

The logic and/or procedures indicated in the flowing diagram or described in other means herein, such as a constant sequence table of the executable code for performing a logical function, may be implemented in any computer readable storage medium so as to be adopted by the code execution system, the device or the equipment (such a system based on the computer, a system including a processor or other systems fetching codes from the code execution system, the device and the equipment, and executing the codes) or to be combined with the code execution system, the device or the equipment to be used. With respect to the description of the present invention, "the computer readable storage medium" may include any device including, storing, communicating, propagating or transmitting program so as to be used by the code execution system, the device and the equipment or to be combined with the code execution system, the device or the equipment to be used. The computer readable medium includes specific examples (a non-exhaustive list): the connecting portion (electronic device) having one or more arrangements of wire, the portable computer disc cartridge (a magnetic device), the random access memory (RAM), the read only memory (ROM), the electrically programmable read only memory (EPROMM or the flash memory), the optical fiber device and the compact disk read only memory (CDROM). In addition, the computer readable storage medium even may be papers or other proper medium printed with program, as the papers or the proper medium may be optically scanned, then edited, interpreted or treated in other ways if necessary to obtain the program electronically which may be stored in the computer memory.

It should be understood that, each part of the present invention may be implemented by the hardware, software, firmware or the combination thereof. In the above embodiments of the present invention, the plurality of procedures or methods may be implemented by the software or hardware stored in the computer memory and executed by the proper code execution system. For example, if the plurality of procedures or methods is to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It can be understood by those having the ordinary skills in the related art that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but is not limited to, read-only memories, magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for testing a performance of a wireless terminal, wherein the wireless terminal is placed in a first anechoic chamber and comprises m antennas, m is a positive integer greater than 1, the method comprises steps of:
   S1, obtaining m pieces of antenna pattern information of the m antennas;
   S2, obtaining n first testing signals according to the m pieces of antenna pattern information, where n is a positive integer greater than 1, wherein S2 comprises:
   obtaining m second testing signals according to the m pieces of antenna pattern information, n pieces of preset antenna pattern information of a base station of a multi-input multi-output system, and a spatial channel propagation model of the multi-input multi-output system, and
   obtaining the n first testing signals according to the m second testing signals and a testing channel transfer matrix;
   S3, feeding the n first testing signals to n testing antennas in the same or a second anechoic chamber, and transmitting the n first testing signals to the wireless terminal by the n testing antennas; and
   S4, obtaining a piece of receiving information of the m antennas for the n first testing signals, and obtaining the performance of the wireless terminal according to the piece of receiving information.

2. The method according to claim 1, wherein a relationship between the m second testing signals, the testing channel transfer matrix and the n first testing signals satisfies formula (1), $$\begin{bmatrix} S_1 \\ S_2 \\ \vdots \\ S_m \end{bmatrix} = \begin{bmatrix} a_{11} & a_{12} & \ldots & a_{1n} \\ a_{21} & a_{22} & \ldots & a_{2n} \\ & \vdots & & \\ a_{m1} & a_{m2} & \ldots & a_{mn} \end{bmatrix} \begin{bmatrix} MT_1 \\ MT_2 \\ \vdots \\ MT_n \end{bmatrix}, \quad (1)$$

$$a_{ij} = G(tx\_antj, ij) + P_{ij} + G(rx\_anti, ij),$$

$$i = 1, 2, \ldots, m; j = 1, 2, \ldots, n$$

where $MT_1$ to $MT_n$ represent the n first testing signals, $S_1$ to $S_m$ represent the m second testing signals, $a_{ij}$ represents a complex path gain from an input port of a $j^{th}$ transmitting antenna to an output port of an $i^{th}$ receiving antenna, $G(tx\_antj,ij)$ represents a gain from the $j^{th}$ transmitting antenna to the $i^{th}$ receiving antenna, $G(rx\_anti,ij)$ represents a gain from the $j^{th}$ receiving antenna to the $j^{th}$ transmitting antenna, $P_{ij}$ represents a space path loss from the input port of the $j^{th}$ transmitting antenna to the output port of the $j^{th}$ receiving antenna.

3. The method according to claim 1, wherein n is greater than or equal to m.

4. The method according to claim 1, wherein the n testing antennas and the wireless terminal remain still in step S3.

5. The method according to claim 1, wherein the piece of receiving information is a throughput.

6. The method according to claim 1, wherein the first anechoic chamber is the same as the second anechoic chamber.

7. The method according to claim 1, wherein a part of the n testing antennas are vertically polarized antennas and the other part of the n testing antennas are horizontally polarized antennas.

8. The method according to claim 2, wherein m is 2 and n is 2, the relationship between the two second testing signals and the two first testing signals satisfies formula (2), $$\begin{bmatrix} MT_1 \\ MT_2 \end{bmatrix} = \begin{bmatrix} a_{11} & a_{12} \\ a_{21} & a_{22} \end{bmatrix}^{-1} \begin{bmatrix} S_1 \\ S_2 \end{bmatrix}, \quad (2)$$

$$a_{11} = G(tx\_ant1, 11) + P_{11} + G(rx\_ant1, 11)$$

$$a_{21} = G(tx\_ant1, 21) + P_{21} + G(rx\_ant2, 21)$$

$$a_{12} = G(tx\_ant2, 12) + P_{12} + G(rx\_ant1, 12)$$

$$a_{22} = G(tx\_ant2, 22) + P_{22} + G(rx\_ant2, 22)$$

where $MT_1$ and $MT_2$ represent the two first testing signals, $S_1$ and $S_2$ represent the two second testing signals, $a_{11}$ represents a complex path gain from an input port of a first transmitting antenna to an output port of a first receiving antenna, $a_{12}$ represents a complex path gain from an input port of a second transmitting antenna to the output port of the first receiving antenna, $a_{21}$ represents a complex path gain from the input port of the first transmitting antenna to an output port of a second receiving antenna, $a_{22}$ represents a complex path gain from the input port of the second transmitting antenna to the output port of the second receiving antenna, $G(tx\_ant1,11)$ represents a gain from the first transmitting antenna to the first receiving antenna, $G(rx\_ant1,11)$ represents a gain from the first receiving antenna to the first transmitting antenna, $P_{11}$ represents a space path loss from the input port of the first transmitting antenna to the output port of the first receiving antenna, $G(tx\_ant1,21)$ represents a gain from the first transmitting antenna to the second receiving antenna, $G(rx\_ant2,21)$ represents a gain from the second receiving antenna to the first transmitting antenna, $P_{21}$ represents a space path loss from the input port of the first transmitting antenna to the output port of the second receiving antenna, $G(tx\_ant2,12)$ represents a gain from the second transmitting antenna to the first receiving antenna, $G(rx\_ant1,12)$ represents a gain from the first receiving antenna to the second transmitting antenna, $P_{12}$ represents a space path loss from the input port of the second transmitting antenna to the output port of the first receiving antenna, $G(tx\_ant2,22)$ represents a gain from the second transmitting antenna to the second receiving antenna, $G(rx\_ant2,22)$ represents a gain from the second receiving antenna to the second transmitting antenna, $P_{22}$ represents a space path loss from the input port of the second transmitting antenna to the output port of the second receiving antenna.

9. A device for testing a performance of a wireless terminal, wherein the wireless terminal is placed in a first anechoic chamber and comprises m antennas, m is a positive integer greater than 1, the first anechoic chamber comprises testing antennas configured to obtain m pieces of antenna pattern information of the m antennas, and the device comprises:

an multi-input multi-output (MIMO) antenna system, configured to obtain n first testing signals according to the m pieces of antenna pattern information, and to feed the n first testing signals to n testing antennas in the first anechoic chamber or n testing antennas in a second anechoic chamber, wherein the n first testing signals are sent to the wireless terminal by the n testing antennas in the first anechoic chamber or the second anechoic chamber, and n is a positive integer greater than 1, wherein the MIMO antenna system is further configured to:

obtain m second testing signals according to the m pieces of antenna pattern information, n pieces of preset antenna pattern information of a base station of a multi-input MIMO system, and a spatial channel propagation model of the multi-input multi-output system; and the MIMO antenna system further comprises a simulator configured to obtain the n first testing signals according to the m second testing signals and a testing channel transfer matrix; and a processor, configured to obtain a piece of receiving information of the m antennas for the n first testing signals, and to obtain the performance of the wireless terminal according to the piece of receiving information.

10. The device according to claim 9, wherein a relationship between the m second testing signals, the testing channel transfer matrix and the n first testing signals satisfies formula (1), $$\begin{bmatrix} S_1 \\ S_2 \\ \vdots \\ S_m \end{bmatrix} = \begin{bmatrix} a_{11} & a_{12} & \ldots & a_{1n} \\ a_{21} & a_{22} & \ldots & a_{2n} \\ & \vdots & & \\ a_{m1} & a_{m2} & \ldots & a_{mn} \end{bmatrix} \begin{bmatrix} MT_1 \\ MT_2 \\ \vdots \\ MT_n \end{bmatrix}, \quad (1)$$

$$a_{ij} = G(tx\_antj, ij) + P_{ij} + G(rx\_anti, ij),$$

$$i = 1, 2, \ldots, m; j = 1, 2, \ldots, n$$

where $MT_1$ to $MT_n$ represent the n first testing signals, $S_1$ to $S_m$ represent the m second testing signals, $a_{ij}$ represents a complex path gain from an input port of a $j^{th}$ transmitting antenna to an output port of an $i^{th}$ receiving antenna, $G(tx\_antj,ij)$ represents a gain from the $j^{th}$ transmitting antenna to the $i^{th}$ receiving antenna, $G(rx\_anti,ij)$ represents a gain from the $j^{th}$ receiving antenna to the $j^{th}$ transmitting antenna, $P_{ij}$ represents a space path loss from the input port of the $j^{th}$ transmitting antenna to the output port of the $j^{th}$ receiving antenna.

11. The device according to claim 9, wherein n is greater than or equal to m.

12. The device according to claim 9, wherein the n testing antennas and the wireless terminal remain still during feeding of the n first testing signals to the n testing antennas.

13. The device according to claim 9, wherein the piece of receiving information is a throughput.

14. The device according to claim 9, wherein the first anechoic chamber is the same as the second anechoic chamber.

15. The device according to claim 9, wherein a part of the n testing antennas are vertically polarized antennas and the other part of the n testing antennas are horizontally polarized antennas.

16. The device according to claim 10, wherein m is 2 and n is 2, the relationship between the two second testing signals and the two first testing signals satisfies formula (2), $$\begin{bmatrix} MT_1 \\ MT_2 \end{bmatrix} = \begin{bmatrix} a_{11} & a_{12} \\ a_{21} & a_{22} \end{bmatrix}^{-1} \begin{bmatrix} S_1 \\ S_2 \end{bmatrix}, \quad (2)$$

$$a_{11} = G(tx\_ant1, 11) + P_{11} + G(rx\_ant1, 11)$$

$$a_{21} = G(tx\_ant1, 21) + P_{21} + G(rx\_ant2, 21)$$

$$a_{12} = G(tx\_ant2, 12) + P_{12} + G(rx\_ant1, 12)$$

$$a_{22} = G(tx\_ant2, 22) + P_{22} + G(rx\_ant2, 22)$$

where $MT_1$ and $MT_2$ represent the two first testing signals, $S_1$ and $S_2$ represent the two second testing signals, $a_{11}$ represents a complex path gain from an input port of a first transmitting antenna to an output port of a first receiving antenna, $a_{12}$ represents a complex path gain from an input port of a second transmitting antenna to the output port of the first receiving antenna, $a_{21}$ represents a complex path gain from the input port of the first transmitting antenna to an output port of a second receiving antenna, $a_{22}$ represents a complex path gain from the input port of the second transmitting antenna to the output port of the second receiving antenna, $G(tx\_ant1,11)$ represents a gain from the first transmitting antenna to the first receiving antenna, $G(rx\_ant1,11)$ represents a gain from the first receiving antenna to the first transmitting antenna, $P_{11}$ represents a space path loss from the input port of the first transmitting antenna to the output port of the first receiving antenna, $G(tx\_ant1,21)$ represents a gain from the first transmitting antenna to the second receiving antenna, $G(rx\_ant2,21)$ represents a gain from the second receiving antenna to the first transmitting antenna, $P_{21}$ represents a space path loss from the input port of the first transmitting antenna to the output port of the second receiving antenna, $G(tx\_ant2,12)$ represents a gain from the second transmitting antenna to the first receiving antenna, $G(rx\_ant1,12)$ represents a gain from the first receiving antenna to the second transmitting antenna, $P_{12}$ represents a space path loss from the input port of the second transmitting antenna to the output port of the first receiving antenna, $G(tx\_ant2,22)$ represents a gain from the second transmitting antenna to the second receiving antenna, $G(rx\_ant2,22)$ represents a gain from the second receiving antenna to the second transmitting antenna, $P_{22}$ represents a space path loss from the input port of the second transmitting antenna to the output port of the second receiving antenna.

17. A non-transitory computer readable storage medium, comprising a computer program, wherein when the computer program is running on a computer, the computer program is configured for executing steps of:

S1, obtaining m pieces of antenna pattern information of m antennas, wherein a wireless terminal is placed in a first anechoic chamber and comprises the m antennas;

S2, obtaining n first testing signals according to the m pieces of antenna pattern information, where n is a positive integer greater than 1, wherein S2 comprises:

obtaining m second testing signals according to the m pieces of antenna pattern information, n pieces of preset antenna pattern information of a base station of a multi-input multi-output system, and a spatial channel propagation model of the multi-input multi-output system, and obtaining the n first testing signals according to the m second testing signals and a testing channel transfer matrix;

S3, feeding the n first testing signals to n testing antennas in the same or a second anechoic chamber, and transmitting the n first testing signals to the wireless terminal by the n testing antennas; and S4, obtaining a piece of receiving information of the m antennas for the n first testing signals, and obtaining the performance of the wireless terminal according to the piece of receiving information.

* * * * *